United States Patent Office 3,594,222
Patented July 20, 1971

3,594,222
LITHIUM CHLORIDE AS ANTISTATIC AGENT IN RUBBER LATEX COMPOSITION AND USE OF SAID LATEX
William Earl Wells, Hogansville, Ga., assignor to Uniroyal, Inc., New York, N.Y.
No Drawing. Filed May 15, 1968, Ser. No. 729,441
Int. Cl. C09k 3/16
U.S. Cl. 117—138.8
8 Claims

ABSTRACT OF THE DISCLOSURE

There is dissolved the use in rubber latex of lithium chloride dissolved in the aqueous phase of rubber latex so as to impart antistatic characteristics to the deposit formed on drying the latex. The amount of lithium chloride preferably equals from 1 to 15% by weight of total solids in the latex composition. There is also disclosed the use of this latex in conjunction with any article of manufacture to dissipate any charge of static electricity that might otherwise build up therein. Thus it can be used in the manufacture of carpets for example as an adhesive to secure the tufts which form the face of the carpet to the backing material such as the primary jute backing. The normal propensity of such carpet to build up a charge of static electricity is thus greatly reduced.

---

This invention relates to a rubber latex composition adapted to form upon drying an electrically conductive deposit which is capable of inhibiting the build-up of a charge of static electricity. It also relates to composite articles typified by fibrous textile material coated with the solids of such a latex composition. It particularly relates to carpet the face of which is made from fibrous textile material which in use normally tends to accumulate a charge of static electricity, wherein such charge is dissipated by the use of such a latex. In addition, it relates to the method of using such a latex.

It is known to those skilled in the art that a degree of protection against the build-up of a static charge induced by friction on the surface of articles of manufacture such as carpets can be obtained by applying a commercial antistatic compound to the article by either a padding operation or by exhausting the antistatic compound into the interstices of the article from an aqueous medium. In many cases, this method affords only temporary protection and the antistatic agent must be re-applied after several cleanings.

The use of metallic fibers incorporated into a latex compound and applied to the back of a fabric is another method which has been used to form an electrically conductive latex compound and reduce static charge build-up of the fabric. The blending of fibers having different propensities for build-up of static electrical charges is another approach which has been attempted. However, these approaches have met with only limited success.

U.S. Pat. 2,717,842 in the name of Vitalis is directed to anti-static treatment of textile materials in fiber, fabric or other form by applying a liquid treating composition (specifically an aqueous solution or dispersion) comprising (1) an antistatic agent which is a soluble inorganic salt that normally is deposited in the form of relatively large crystals upon volatilization of the solvent in which it is dissolved and (2) a crystal growth-inhibiting agent in an amount, with respect to the said antistatic agent, that is sufficient to inhibit the deposition of such crystals. However, this patent does not suggest the present invention but is limited to the use of antistatic salts that are normally deposited in large crystals in conjunction with a crystal growth-inhibiting agent. In contrast, the antistatic salt used in the present invention does not require the use of any such crystal growth-inhibiting agent. Moreover, the present invention involves the application of an antistatic salt not shown in the Vitalis patent, namely lithium chloride, dissolved in the aqueous phase of rubber latex. This latex can be the same type as that which has for many years been used in the manufacture of carpet as a means of securing the tufts of the textile fibrous material which form the carpet face to the primary jute backing or to form a coating on the lower face of a carpet made by simple mechanical tufting.

In my invention, I use lithium chloride as the antistatic agent. I dissolve it in the aqueous phase of a rubber latex composition. I can then use this rubber latex composition containing the dissolved lithium chloride in the manufacture of carpets in the conventional way. Typically I apply the latex composition as an adhesive to the tufted primary jute backing in the conventional manner with the result that upon driving off the water in the latex composition the tufts are firmly bonded to the backing. In addition, if a secondary carpet backing such as another layer of jute is used, latex composition containing dissolved lithium chloride preferably is also used as a "scrimming" adhesive to bond the tufted primary backing to the secondary backing; this constitutes a preferred embodiment of my invention because it provides a continuous electrical path from each tuft to the entire floor-engaging face of the carpet.

It is possible to achieve the advantages of my invention by applying the lithium chloride-containing latex composition to the back of carpet made by simple mechanical tufting. However better results are achieved when the latex composition is used not only as the tufting adhesive but in addition is applied in the form of a coating over the entire back of the carpet, with or without a secondary jute backing, since this double use of lithium chloride-containing latex composition provides a better electrical path than the single use.

If desired, further protection against the buildup of a static electrical charge in the carpet can be achieved by providing means to conduct the static electricity to the ground. This may take the form of one or more metallic conductors leading from the bottom of the carpet to a ground or grounds. Such additional protection is especially advantageous in installations in hospitals, etc. where sparks create a fire or explosion hazard.

In practicing my invention I can use any conventional rubber latex composition. The latex may be based on any of the known rubbery polymers. Thus it may be natural rubber latex or any synthetic rubber latex, such as latices made from polybutadiene, butadiene-styrene rubbery copolymers which typically contain from 40 to 95% by weight of combined butadiene and correspondingly from 60 to 5% of combined styrene, butadiene-acrylonitrile rubbery copolymers, butyl rubber, EPDM rubbers, etc. The rubber in the latex may be carboxylated or uncarboxylated.

The latex is compounded in accordance with techniques well known in the art. Thus, it may be compounded with accelerators, vulcanizing agents, particularly sulfur, ammonium zirconyl carbonate, zinc oxide, fillers such as whiting, clay, starch, etc.

Any fiber which normally tends to build up a charge (whether positive or negative) of static electricity as a result of friction on its surface usually as a result of walking (in the case of carpet) can be successfully treated in accordance with my invention. Examples of fibers which give trouble with static build-up are polyolefin fibers such as polypropylene, nylon, polyacrylonitrile, etc. The invention is particularly applicable with synthetic or man-made fibers, but can be applied to natural fibers such as wool which is often used in carpets.

The invention is applicable to viscose rayon, acetate rayon and other man-made fibers derived from cellulose.

Use of the lithium chloride-containing rubber latex composition of my invention for static reduction lends itself particularly to use in the case where conductive metal fibers, such as very fine stainless steel fibers of known type, e.g., that manufactured by Brunswick Corporation and sold under the trademark "Brunsmet," are spun in known manner with the fibrous textile material in the manufacture of the yarns from which the carpet face is made. By the use of my lithium chloride-containing latex in conjunction with such conductive metallic fibers in the tufts which constitute the face of the carpet, it is possible to use a greatly reduced proportion of such metal fiber with a correspondingly great reduction in cost of the carpet. For example, by using lithium chloride in the latex composition in the amounts disclosed herein, it is possible to reduce the amount of conductive metal fibers in the tufts to not over 2% by weight of the tufts. In fact it is possible, by using lithium chloride in the latex composition, to reduce the amount of stainless steel fiber used to as little as ⅛ of 1% of the yarn from which the tufts are formed, and still get less static charge build-up than using stainless steel fiber alone in a quantity many times greater. Furthermore, the use of lithium chloride in accordance with my invention overcomes the problem of dissipating the electrical charge throughout the carpet backing which has been serious with the use of the metal fiber alone in the face fiber of carpet.

The amount of lithium chloride dissolved in the aqueous phase of the latex composition should of course be sufficient to achieve the desired anti-static effect in the final product. The level of lithium chloride can vary widely depending on many factors. Generally speaking, a level of from 1 to 15% by weight based on the total dry solids in the latex is used. When the tufts of the carpet contain the conductive metal fibers described above, a far lower level composition will suffice. Thus, with such metal fibers a level of from 1 to 5% of lithium chloride on the above basis is highly effective, fair results are achieved at a level of approximately 1.25%, good results are achieved at a level of 2.4%, but a level of about 3.8% is preferred for certainty of effect. Without the metal fibers, the level of lithium chloride must be much higher, say 3 to 15%. There appears to be a unique cooperation between the lithium chloride in the latex deposit and the metal fibers in the carpet face.

In addition to effecting rapid dissipation of the static electrical charge that would otherwise be built up in the article, such as carpet, treated in accordance with my invention, my invention significantly reduces the cost of keeping such an article clean in service by greatly reducing its attraction for airborne dust.

The following examples illustrate my invention.

EXAMPLE 1

In this example my invention was evaluated by the following method. The latex containing the quantity of lithium chloride indicated in the following table was applied to the primary jute backing of carpet samples made by mechanical tufting from polypropylene fiber marketed under the trademark "Polycrest." The latex coating which was applied on the lower or floor engaging surface of the carpet samples was dried for 15 minutes at a temperature of 250° F. The samples were conditioned in an environmental control chamber for 24 hours at a relative humidity of 20%. The electrical resistance (R) of the conditioned treated carpet samples and also the half-life ($t/2$) of an induced charge of 100 volts on the samples were measured, the instrument used for these evaluations being a Rothschild electrostatic volt meter.

The lithium chloride (None was used in the control, of course.) was pre-dissolved in water to form a 10% solution and the resulting solution was added to a conventional pre-compounded carpet latex composition, such as one having the formulation shown in Example 2 (without the lithium chloride), in the proportions indicated. The latex was stirred mechanically while the lithium chloride was added. The test values obtained were:

| Sample | $t/2$ in sec. | Ohms resistance (R) |
|---|---|---|
| Control | >180 | $180 \times 10^{11}$ |
| 1.0% LiCl (based on wt. of wet latex) | >180 | $180 \times 10^{11}$ |
| 2.0% LiCl (based on wt. of wet latex) | <0.1 | $0.1 \times 10^{11}$ |
| 3.0% LiCl (based on wt. of wet latex) | <0.1 | $0.1 \times 10^{11}$ |

EXAMPLE 2

The following latex composition gave excellent results when used in the manufacture of carpet in the conventional manner:

CARPET BACK-SIZING LATEX COMPOSITION

| | Parts by weight dry | Parts by weight wet |
|---|---|---|
| Butadiene (46%)-styrene (54%) rubbery copolymer latex (48% solids) (brought to a pH of 9.5 with aqueous ammonia) | 100.00 | 217.00 |
| Polymerized sodium salt of alkyl naphthalene sulfonic acid (25% solids) | 2.00 | 8.00 |
| Tetrapotassium pyrophosphate (50% soln.) | 1.00 | 2.00 |
| Bacterial and fungus inhibitor (25% soln.) | 0.15 | 0.60 |
| Lithium chloride (25% soln.) | 16.00 | 64.00 |
| Phenolic antioxidant | 1.00 | 2.08 |
| Defoamer | .30 | .30 |
| Whiting (calcium carbonate) | 300.00 | 300.00 |
| Sodium polyacrylate thickener (10% soln.) | 1.50 | 15.00 |
| Water to 68% total solids | | 11.00 |
| Total weight | 421.95 | 619.98 |

This composition was used as an adhesive in the manufacture of carpet faced with tufts of yarn made from polypropylene fiber containing 0.6% by weight of the above-mentioned fine stainless steel fiber spun with the polypropylene fiber during manufacture of the yarn. The adhesive was applied to the tufted primary jute backing whereupon the water in the adhesive was driven off. Very favorable results in reduction of static charge build-up in the resulting carpet were achieved even at a relative humidity as low as 15% and there was no problem of dissipating the electrical charge throughout the back of the carpet. A control carpet made in the same way with the same latex composition except that the lithium chloride was omitted exhibited an unacceptably high level of static charge build-up.

As illustrative of the fact that with my invention no crystal growth inhibitor needs to be used in conjunction with the lithium chloride, I would point out that, to the best of my knowledge and belief, none of the ingredients of the latex composition used in the foregoing examples could be classified as a "crystal growth inhibitor" in the amounts employed. This indicates that lithium chloride does not present the problem to which Pat. 2,717,842 is addressed.

It is surprising and unobvious to find that lithium chloride could be used as an anti-static agent in rubber latex compositions in accordance with my invention. In particular, lithium chloride can be used in amounts sufficient to achieve the desired anti-static effect without causing objectionable coagulation of the latex composition. If coagulation took place after admixture of the lithium chloride it would be impossible to achieve my results because a coagulated latex mass could not be applied as desired. In contrast, sodium chloride which would be expected to perform like lithium chloride, since both are alkali metal chlorides, is a well-known and commonly used latex coagulant. In fact, attempts by me to add 10% aqueous solutions of sodium chloride, barium chloride, cupric sulfate and cadmium sulfate to the latex composition shown in Example 2 above (but without the lithium chloride) resulted in coagulation in every instance.

A marked advantage of my invention over the technique suggested in Pat. 2,717,842 is that my technique involves application of the electrolyte, lithium chloride in, not on, the material (i.e., the latex) used to form the finished article and thus my invention differs in kind. It is possible that a finished carpet might be antistatted by the process of Pat. 2,717,842, but this would involve an extra step in manufacture. The great utility of my technique is that the electrolyte, lithium chloride, is added before the manufactured article is finished and thus entails no additional step. Furthermore, if one were to attempt to antistat a finished carpet by the technique of Pat. 2,717,842, the antistat could not permeate the latex deposit in the carpet because it is highly water-impervious; the result would be that the antistat would be manifested only on the surface; in contrast, when lithium chloride is used in latex in making carpet in accordance with my invention the antistat (lithium chloride) is distributed throughout the latex deposit and thus provides a continuous electrical path from the tufts, especially if the tufts contain metal fiber, to the entire floor-engaging face of the carpet.

While my invention is extremely useful in reducing the build-up of static electricity in carpets, it is not limited thereto but can be used in other textile fabrics and articles such as upholstery, clothing, for example safety clothing used where static electricity is a hazard, and any other shaped or formed articles which when dry normally are subject to the build-up of static electricity such as plastics in sheet or film form, etc.

Having thus described my invention, what I claim and desire to protect by Letters Patent is:

1. An article of manufacture which in use normally tends to accumulate a charge of static electricity, said article having attached thereto the dried deposit of a rubber latex composition containing lithium chloride, the lithium chloride content of said deposit serving to inhibit the build-up of a charge of static electricity in said article.

2. An article as set forth in claim 1 wherein the amount of said lithium chloride is equal to from 1 to 15% by weight of said deposit.

3. A composite article of manufacture comprising fibrous textile material which in use normally tends to accumulate a charge of static electricity, said fibrous textile material having attached thereto the dried deposit of a rubber latex composition containing lithium chloride, the lithium choride content of said deposit serving to dissipate any charge of static electricity built up in said article.

4. A composite article of manufacture as set forth in claim 3 wherein the amount of said lithium chloride is equal to from 1 to 15% by weight of said deposit.

5. Carpet comprising tufts of fibrous textile material which in use normally tends to accumulate a charge of static electricity, said tufts of fibrous textile material being attached to a backing material by the dried deposit of a rubber latex composition containing lithium chloride, the lithium chloride content of said deposit serving to dissipate any charge of static electricity built up in said carpet.

6. Carpet as set forth in claim 5 wherein the amount of said lithium chloride is equal to from 1 to 15% by weight of said deposit.

7. A composite article of manufacture as set forth in claim 3 wherein said fibrous textile material is polypropylene and wherein the amount of said lithium chloride is equal to from 1 to 15% by weight of said deposit.

8. Carpet as set forth in claim 5 wherein said fibrous textile material is polypropylene and wherein the amount of said lithium chloride is equal to from 1 to 15% by weight of said deposit.

References Cited

UNITED STATES PATENTS

| | | | |
|---|---|---|---|
| 2,447,538 | 8/1948 | Rust | 117—161X |
| 2,447,878 | 8/1948 | Rust | 117—161X |
| 2,463,282 | 3/1949 | Kang | 260—29.6 |
| 2,637,095 | 5/1953 | Mersereau | 161—67 |
| 2,718,478 | 9/1955 | Fluck et al. | 117—139.5 |
| 3,205,092 | 9/1965 | Rosenberg | 117—235 |
| 3,324,067 | 6/1967 | Donaldson et al. | 117—163X |
| 3,441,435 | 4/1969 | Kirschnek et al. | 117—139.5 |

WILLIAM D. MARTIN, Primary Examiner

T. G. DAVIS, Assistant Examiner

U.S. Cl. X.R.

117—139.5, 161; 161—67